United States Patent

Hayashibara

(10) Patent No.: US 7,974,513 B2
(45) Date of Patent: Jul. 5, 2011

(54) OPTICAL DISK PLAYER

(75) Inventor: Kazuki Hayashibara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1260 days.

(21) Appl. No.: 11/603,093

(22) Filed: Nov. 22, 2006

(65) Prior Publication Data

US 2007/0116441 A1   May 24, 2007

(30) Foreign Application Priority Data

Nov. 24, 2005  (JP) ................. 2005-339362

(51) Int. Cl.
*H04N 5/775* (2006.01)
*H04N 5/765* (2006.01)

(52) U.S. Cl. .................. 386/230; 386/231; 386/234

(58) Field of Classification Search .......... 386/1, 45–46, 386/125–126, 95–96
See application file for complete search history.

(56) References Cited

U.S. PATENT DOCUMENTS

| | | | |
|---|---|---|---|
| 6,252,590 B1 * | 6/2001 | Sawai et al. | 345/667 |
| 6,573,819 B1 * | 6/2003 | Oshima et al. | 386/329 |
| 2004/0239816 A1 | 12/2004 | Ando | |
| 2005/0068346 A1 | 3/2005 | Ogawa et al. | |
| 2005/0128349 A1 | 6/2005 | Takamori et al. | |
| 2005/0141851 A1 | 6/2005 | Nakayama et al. | |
| 2005/0141857 A1 | 6/2005 | Shimozawa et al. | |
| 2005/0283551 A1 * | 12/2005 | Oh | 710/62 |
| 2007/0098366 A1 * | 5/2007 | Nakashika et al. | 386/95 |

FOREIGN PATENT DOCUMENTS

| | | |
|---|---|---|
| EP | 1 610 552 A2 | 12/2005 |
| JP | 2002-77834 A | 3/2002 |
| JP | 2004-357029 A | 12/2004 |
| JP | 2005-109703 A | 4/2005 |
| JP | 2005-167895 A | 6/2005 |
| JP | 2005-189587 A | 7/2005 |
| JP | 2005-191780 A | 7/2005 |
| JP | 2005-341190 A | 12/2005 |

OTHER PUBLICATIONS

Notice of the Reason for Refusal dated Feb. 12, 2008 with English translation (Six (6) Pages).

* cited by examiner

*Primary Examiner* — Thai Tran
*Assistant Examiner* — Nigar Chowdhury
(74) *Attorney, Agent, or Firm* — Crowell & Moring LLP

(57) ABSTRACT

A user can simply select and set up resolution of a monitor display device 2 among the resolutions which the monitor display device 2 supports, according to his/her taste, only by operating a specific key such provided in the remote control 4. The resolution of the monitor display device 2 is changed responding to a number of pressing down of the specific key by the user. When a command is inputted once, the resolution of video signals outputted from the optical disc player 1 is changed to be the lowest level. When the command is inputted twice, the resolution of the video signals is changed to be the next level. When the specific key is pressed down furthermore while the monitor display device 2 displays the images at the highest resolution, the output of the video signals from the optical disc player 1 is stopped. When the specific key is pressed down furthermore, the video signals are outputted at the lowest resolution.

5 Claims, 2 Drawing Sheets n = 0 : HDMI OUTPUT OFF
n = 1 : 480 PROGRESSIVE
n = 2 : 720 PROGRESSIVE
n = 3 : 1080 INTERLACE

OPTICAL DISK PLAYER

BACKGROUND OF THE INVENTION

1. Field of the Invention

The present invention relates to an optical disk player which output video signals to a monitor display device through an HDMI (High-Definition Multimedia Interface) cable, and an AV (Audio and Visual) system using the optical disc player.

2. Description of the Related Art

Conventionally, an optical disk player such as a DVD player is adapted to switch resolution of video output signals corresponding to a resolution of a monitor display device which displays images on a screen. For example, Japanese Laid-Open Patent Publication No. 2005-191780 shows a DVD player which determines automatically the highest resolution of a monitor display device connected thereto at which the monitor display device can display and then outputs video signals at that resolution. Japanese Laid-Open Patent Publication No. 2005-189587 shows a DVD player which converts resolution of image data corresponding to resolution of a monitor display device obtained through a communication line. Japanese Laid-Open Patent Publication No. 2005-109703 shows an AV (Audio and Visual) system which can display a setting status of an AV amplifier, regardless of a connection system between the AV amplifier and a DVD player. Japanese Laid-Open Patent Publication No. 2004-357029 shows a video display device which has a memory for storing data such as resolution of a monitor display device and so on.

However, as for DVD players described in the above patent documents, it is difficult for a user to adapt the resolution of the monitor display device to his/her taste, and thus any of the above conventional DVD players are not user-friendly. In particular, a high-resolution video is not always most appropriate to elderly people lowing their good eyesight, and an optical disk player which enables a simple conversion of the resolution is eagerly awaited in the market.

SUMMARY OF THE INVENTION

An object of the present invention is to provide an optical disk player which enable a user to set up simply a resolution of a monitor display device among resolutions which the monitor display device supports, according to his/her taste, and an AV system using the optical disc player.

An optical disk player in accordance with an aspect of the present invention comprises: an optical pickup which reads out signals from an optical disc by irradiating a laser beam on the optical disk; a signal processor which processes the signals read out by the optical pickup; a decoder which decodes the signals processed by the signal processor; an HDMI output terminal to which a monitor display device is connectable through an HDMI cable and outputs the signals decoded by the decoder to the monitor display device through the HDMI cable; a main controller which controls the optical pickup, the signal processor, and the decoder; and a remote controller which is operated by a user to input various commands to the main controller. The main controller obtains information relating to resolutions that the monitor display device supports. When a command for switching the resolution of the monitor display device is inputted through the remote controller, the main controller converts video signals among the signals decoded by the decoder to have a resolution corresponding to the command and outputs the converted video signals to the monitor display device.

On the other hand, an AV system in accordance with another aspect of the present invention comprises an optical disc player, a monitor display device which are connected each other through an HDMI cable, and a remote controller for controlling the optical disc player. When powers of the optical disc player and the monitor display device are switched on, the optical disc player obtains information relating to resolutions that the monitor display device supports from the monitor display device. When a command for switching the resolution of the monitor display device is transmitted to the optical disc player from the remote controller, the optical disc player outputs video signals at a predetermined resolution selected among the resolutions that the monitor display device supports corresponding to the command.

According to the above mentioned configurations, the user can simply select and set up the resolution of the monitor display device among the resolutions that the monitor display device supports, according to his/her taste, only by operating the remote controller, so that the optical disk player or the AV system gets more convenient. In particular, the resolution of the monitor display device is switched responding to a number of the command which is inputted to change the resolution of the monitor display by the user. For example, when the command is inputted once, the resolution of the monitor display device is switched to be the lowest level. When the command is input twice, the resolution is switched to be the next level up. When the command is inputted furthermore when the monitor display device displays the images at the highest resolution, the output of the video signals is stopped. The resolution of the monitor display device can be switched responding to the number of the commands inputted by the user, so that the user can simply change the resolution of the monitor display device according to his/her taste. Since the resolution of the monitor display device is switched among the resolutions that the monitor display device supports, the user is not forced to carry out an additional operation.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
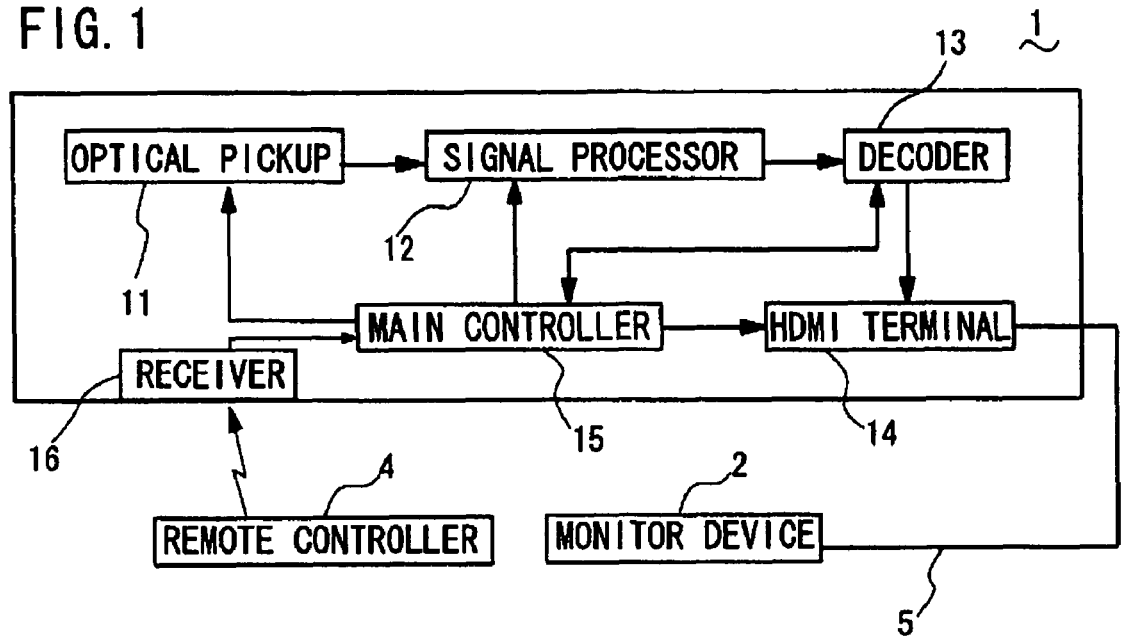
FIG. 1 is a block diagram showing a configuration of an AV system comprising an optical disk player in accordance with a preferred embodiment of the present invention.

A preferred embodiment of the present invention is described with reference to the attached drawings. FIG. 1 shows a configuration of an AV (Audio Visual) system 100 comprising an optical disk player 1 and a monitor display device 2 for displaying images and outputting sounds, signals of which are reproduced by the optical disk player 1.

The optical disk player 1 comprises an optical pickup 11 which reads out signals with irradiating laser beams on an optical disk, a signal processor (signal processing means) 12 which processes the signals read out by the optical pickup 11, a decoder (signal decoding means) 13 which decodes the signals processed by the signal processor 12, an HDMI (High-Definition Multimedia Interface) output terminal 14 to which an HDMI cable 5 is connected and then outputs the signals which are decoded by the decoder 13 to outside of the player, a main controller (control means) 15 which controls the optical pickup 11, the signal processor 12, and the decoder 13, a receiver 16 which receives a command transmitted from a remote controller 4 (command input means), and so on.

The optical disk player 1 and the monitor display device 2 are connected to each other through the HDMI cable 5, and the digital video and audio signals are transmitted through the HDMI cable 5. When powers of the optical disk player 1 and the monitor display device 2 are switched on, information such as a specification of the monitor display device 2 and so on (for example, information relating to the resolutions which the monitor display device 2 supports) is sent out to the optical disk player 1 through the HDMI cable 5.

The optical disk player 1 of this embodiment has a function of selecting a resolution among the resolutions that the monitor display device 2 supports. This function is carried out when the user operates a specific key which is provided in the remote controller 4 (an HDMI key, for example).

Figure 2:
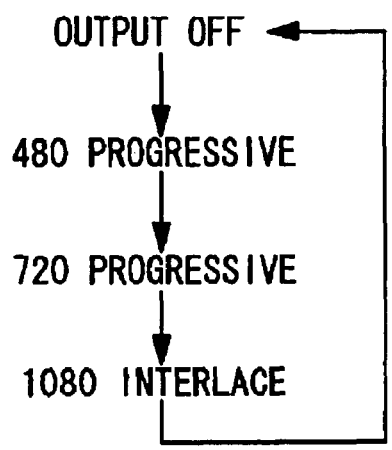
FIG. 2 is a diagram showing resolutions, which are sequentially changed corresponding to an operation of a user operating a remote controller of a monitor display device.

FIG. 2 shows the resolutions that the monitor display device 2 supports, which are sequentially switched when the HDMI key in the remote controller 4 is pressed down more than once by the user. Hereupon, it is assumed that the monitor display device 2 supports the resolutions of 480 progressive, 720 progressive, and 1080 interlace.

At the beginning, when the HDMI key in the remote controller 4 is pressed down once, the resolution of the monitor display device 2 is set to be the lowest level, that is, the resolution of 480 progressive. When the HDMI key is pressed down additionally (twice), the resolution of the monitor display device 2 is switched to increase the resolution degree by one level, that is, the resolution of 720 progressive. When the HDMI key is pressed down afterwards (thrice), the resolution of the monitor display device 2 is switched to be the highest level, that is, the resolution of 1080 interlace. When the HDMI key is further pressed down while the monitor display device 2 displays the images at the highest resolution, the controller 15 stops the output of the video signals to the monitor display device 2 through the HDMI output terminal 14. When the HDMI key is pressed down additionally while the output of the video signals is stopped, the video signals having the resolution of 480 progressive is started to be outputted to the monitor display device 2, again.

Alternatively, when the HDMI key is further pressed down while the monitor display device 2 displays the images at the highest resolution, it is possible to switch the resolution of the monitor display device 2 to the lowers resolution without stopping the output of the video signals.

Figure 3:
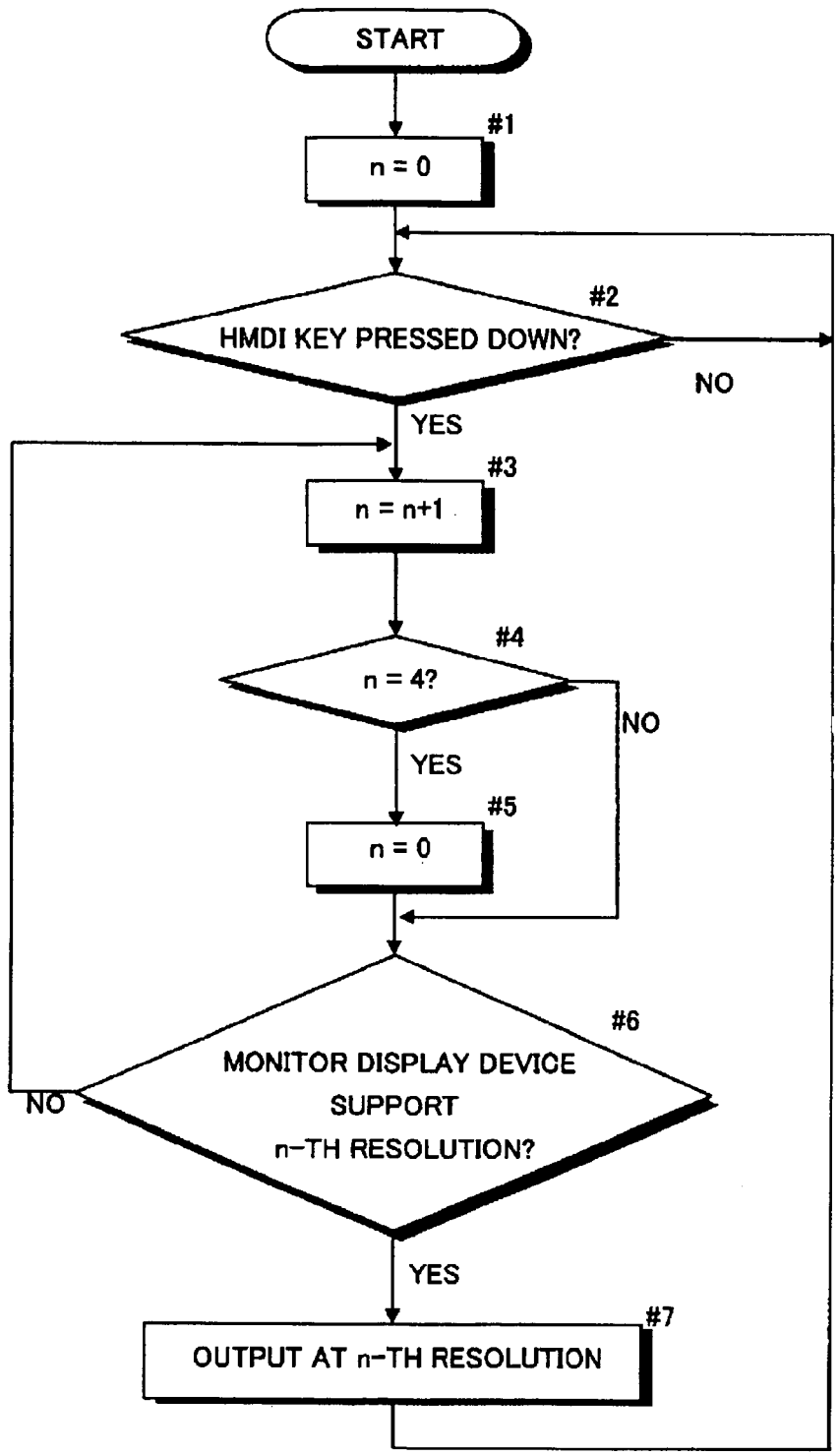
FIG. 3 is a flowchart showing a process of a main controller in the AV system.

FIG. 3 shows a process in the main controller 15 when the resolution of the monitor display device 2 is switched. The main controller 15 obtains the information relating to the resolution of the monitor display device 2 when the powers of the optical disk player 1 and the monitor display device 2 are switched on, and carries out the following process based on the information. The main controller 15 also switches the resolution of the monitor display device 2 according to a resolution variable n. Hereupon, the resolution variable $n=0$ indicates that the output of the video signals from the HDMI output terminal 14 is off. The resolution variable $n=1$ indicates 480 progressive. The resolution variable $n=2$ indicates 720 progressive. The resolution variable $n=3$ indicates 1080 interlace.

At the beginning, the main controller 15 initializes the resolution variable n ($n=0$) (step #1). Then, when the HDMI key in the remote controller 4 is pressed down (YES in step #2), the main controller 15 increments the resolution variable n by one ($n=n+1$) (step #3). When the resolution variable n reaches to four ($n=4$) (YES in step #4), the main controller 15 initializes the resolution variable n ($n=0$) (step #5), and then goes to step #6. In contrast, when the resolution variable n does not reach to four ($n\approx4$) (NO in step #4), the main controller 15 skips the step #5 and then goes to the step #6. At the step #6, it judges whether the monitor display device 2 supports the n-th resolution or not. When the monitor display device 2 supports the n-th resolution (YES in step #6), the main controller 15 converts the video signals to have the n-th resolution, and outputs the converted video signals from the HDMI output terminal 14 (step #7), and then returns to the step #2. When the monitor display device 2 does not support the n-th resolution (NO in step #6), the main controller 15 goes back to the step #3 with no processing.

As described above, according to the optical disk player 1 of this embodiment, the user can simply select and set up the resolution of the monitor display device 2 among the resolutions which the monitor display device 2 supports, according to his/her taste, only by operating the specific key such as the HDMI key provided in the remote control 4, so that the optical disk player 1 gets more convenient. In particular, the resolution of the monitor display device 2 is switched responding to the number of pressing down of the HDMI key by the user. For example, when the command is inputted once, the resolution of the video signals outputted from the optical disc player 1 is changed to be the lowest level, that is, the resolution of 480 progressive. When the command is inputted twice, the resolution of the video signals outputted from the optical disc player 1 is changed to be the next level up to the resolution of 720 progressive. When the HDMI key is pressed down furthermore while the monitor display device 2 displays the images at the highest resolution of 1080 interlace, the output of the video signals from the optical disc player 1 is stopped. When the HDMI. key is pressed down furthermore, the video signals are outputted at the lowest resolution of 480 progressive. The resolution of the monitor display device 2 is changed responding to the number of command inputs as described above, so that the user can simply change the resolution to his/her taste. A change of the resolution is within a limitation of resolution which the video output device supports, so that the user is not forced to carry out the additional operation.

The present invention is not limited to the configuration of the embodiment described above, however, any configuration is applicable if it grasps a resolution which an equipment, which is connected through a HDMI cable, supports before a playing, and selects appropriately the resolution of the video among the resolutions which the monitor display device 2 supports when the command to change the resolution is inputted. Moreover, the present invention is not limited to the optical disk player, however, it is widely applicable to a device which outputs video signals (a television receiver, for example).

This application is based on Japanese patent application 2005-339623 filed Nov. 24, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should monitor display device is transmitted to the optical disc player from the remote controller, the optical disc player outputs video signals at a predetermined resolution selected among the resolutions that the monitor display device supports corresponding to the command.

According to such a configuration, the user can simply select and set up the resolution of the monitor display device among the resolutions that the monitor display device supports, according to his/her taste, only by operating the remote controller, so that the AV system gets more convenient.

This application is based on Japanese patent application 2005-339623 filed Nov. 24, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disk player comprising:
an optical pickup which reads out signals from an optical disc by irradiating a laser beam on the optical disk;
a signal processor which processes the signals read out by the optical pickup;
a decoder which decodes the signals processed by the signal processor;
an HDMI (High-Definition Multimedia Interface) output terminal to which a monitor display device is connectable through an HDMI cable and outputs the signals decoded by the decoder to the monitor display device through the HDMI cable;
a main controller which controls the optical pickup, the signal processor, and the decoder; and
a remote controller which is operated by a user to input various commands to the main controller, wherein
the main controller obtains information relating to resolutions that the monitor display device supports;
the command for switching the resolution of the monitor display device is transmitted from the remote controller to the main controller when a specific key provided in the remote controller is operated by the user;
when a command for switching the resolution of the monitor display device is inputted through the remote controller, the main controller converts video signals among the signals decoded by the decoder to have a resolution corresponding to the command and outputs the converted video signals to the monitor display device;
when the command is inputted first, the control means converts video signals to have a resolution of lowest level among the resolutions that the monitor display device supports and outputs the converted video signals to the monitor display device;
when the command is inputted additionally, the control means converts video signals to have a resolution higher by one level than current level among the resolutions that the monitor display device supports and outputs the converted video signals to the monitor display device; and
when the command is inputted while the monitor display device displays images at highest resolution, the controller stops to output the video signals to the monitor display device.

2. The optical disc player in accordance with claim 1, wherein
the main controller obtains the information relating to the resolutions that the monitor display device supports, when a power of the optical disc player is switched on.

3. An optical disk player comprising:
an optical pickup which reads out signals from an optical disc by irradiating a laser beam on the optical disk;
a signal processing means which processes the signals read out by the optical pickup;
a signal decoding means which decodes the signals processed by the signal processing means;
an HDMI (High-Definition Multimedia Interface) output terminal to which an HDMI cable is connected and outputs the signals decoded by the signal decoding means to outside of the player through the HDMI cable;
a control means which controls the optical pickup, the signal processing means, and the signal decoding means; and
a command input means which is operated by a user to input various commands to the control means, wherein
when power of the optical disc player is switched on, the control means obtains information relating to resolutions which a monitor display device connected to the HDMI output terminal through the HDMI cable supports;
when the command input means is operated by the user and a command for changing the resolution of the monitor display device is inputted first, the control means converts video signals among the signals decoded by the decoding means to have a resolution of lowest level among the resolutions that the monitor display device supports and outputs the converted video signals to the monitor display device;
when the command input means is operated by the user and a command for changing the resolution of the monitor display device is inputted additionally, the control means converts video signals among the signals decoded by the decoding means to have a resolution higher by one level than current level among the resolutions that the monitor display device supports and outputs the converted video signals to the monitor display device; and
when the command input means is operated by the user and a command for changing the resolution of the monitor display device is inputted while the monitor display device displays images at highest resolution, the control means stops to output the video signals to the monitor display device.

4. An Audio and Visual system comprising an optical disc player, a monitor display device which are connected each other through an HDMI (High-Definition Multimedia Interface) cable, and a remote controller for controlling the optical disc player, wherein
when powers of the optical disc player and the monitor display device are switched on, the optical disc player obtains information relating to resolutions that the monitor display device supports from the monitor display device;
when a command for switching the resolution of the monitor display device is transmitted to the optical disc player from the remote controller, the optical disc player outputs video signals at a predetermined resolution selected among the resolutions that the monitor display device supports corresponding to the command;

when the command is inputted first, the optical disc player converts video signals to have a resolution of lowest level among the resolutions that the monitor display device supports and outputs the converted video signals to the monitor display device;

when the command is inputted additionally, the optical disc player converts video signals to have a resolution higher by one level than current level among the resolutions that the monitor display device supports and outputs the converted video signals to the monitor display device; and when the command is inputted while the monitor display device displays images at highest resolution, the optical disc player stops to output the video signals to the monitor display device.

5. The Audio and Visual system in accordance with claim 4, wherein the optical disc player switches the resolution of the video signals sequentially to increase the resolution degree by one level among the resolutions that the monitor display device supports whenever the command is inputted.

* * * * *